United States Patent [19]

Staab et al.

[11] 4,223,897
[45] Sep. 23, 1980

[54] ANTI-STICK, NON-LIQUID ABSORBING GASKET

[75] Inventors: Thomas E. Staab, Hinsdale; James H. Larsen, Brookfield, both of Ill.

[73] Assignee: Dana Corporation, Toledo, Ohio

[21] Appl. No.: 958,267

[22] Filed: Nov. 6, 1978

[51] Int. Cl.³ .............................................. F16J 15/12
[52] U.S. Cl. ........................... 277/235 B; 277/DIG. 6
[58] Field of Search ............... 277/234, 235 R, 235 A, 277/235 B, 236, 233, DIG. 6

[56] References Cited

U.S. PATENT DOCUMENTS

| 2,025,486 | 12/1935 | Victor | 91/68 |
|---|---|---|---|
| 2,040,348 | 5/1936 | Victor et al. | 91/70 |
| 2,055,471 | 9/1936 | Balfe | 277/DIG. 6 |
| 2,074,388 | 3/1937 | Gordon | 277/235 B X |
| 2,170,363 | 8/1939 | Balfe | 277/235 B |
| 2,188,721 | 1/1940 | McWhorter et al. | 277/235 B X |
| 2,571,075 | 10/1951 | Tomunak | 117/155 |
| 2,753,199 | 7/1956 | Victor | 277/235 B |
| 3,145,207 | 8/1964 | Wohnseidler | 260/249.6 |
| 3,155,628 | 11/1964 | Bloomfield | 260/2 |
| 3,532,349 | 10/1970 | Czernik | 277/235 B X |
| 3,679,218 | 7/1972 | Farnam | 277/233 |
| 3,738,558 | 6/1973 | Colwell | 277/235 B |
| 3,767,211 | 10/1973 | Amphlett | 277/DIG. 6 X |
| 3,970,322 | 7/1976 | Stecher et al. | 277/235 B X |

FOREIGN PATENT DOCUMENTS 1930867 12/1970 Fed. Rep. of Germany ....... 277/235 B

Primary Examiner—Robert S. Ward, Jr.
Attorney, Agent, or Firm—Wilson, Fraser, Barker & Clemens

[57] ABSTRACT

An anti-stick, non-liquid absorbing laminated gasket and a process for its preparation are disclosed in which a metallic base sheet has a bonded fibrous layer adhered to at least one face of the sheet. The fibrous layer contains a liquid-impermeable resinous impregnant and an anti-stick coat disposed along an outer face of the fibrous layer. The resinous impregnant may extend to the outer face of the fibrous layer while leaving fibers thereof exposed to which the anti-stick coat adheres. Or the resinous impregnant may extend beyond the outer face of the fibrous layer to form a skin and the anti-stick coat adheres to the extension of the impregnant after it is tackified by an organic solvent.

14 Claims, 4 Drawing Figures

ANTI-STICK, NON-LIQUID ABSORBING GASKET

BACKGROUND OF THE INVENTION

Gasketing materials are commonly used to seal mating parts against fluid leaks. As examples, gaskets are frequently used between sections of conduits, such as in conduits for steam or air, and in automotive parts, such as in carburetors, manifolds, and cylinder heads. Not only must gaskets perform a primary function of sealing, they preferably should not stick to the parts against which they bear and, additionally, should have a relatively long service life.

In those cases where a laminated gasket is used and exposed to liquids, there is a further problem of resisting delamination. This problem is pecularily accentuated in cylinder head gaskets where the gasketing material is constantly exposed to circulation of a coolant, principally water. Such a coolant normally contains a number of chemical additives, such as rust inhibitors, like the chromates. Paradoxically, however, many of the added chemicals like rust inhibitors attack a gasket and particularly weaken the adherence of plies of a laminated gasket, thereby causing delamination.

In many instances, a gasket has by design a passage or metering hole through which a coolant is intended to pass, or the gasket may block the flow of coolant altogether. This results in added exposure to wear and can hasten the delamination of a gasket. In any case, a coolant tends in time to penetrate into the gasket and, where a metal core is present, corrode the core. This further weakens the adhesion line at the interface between the metal core and gasket facing, resulting in blistering which then accelerates delamination. There have been instances when parts of a gasket break loose and enter the coolant circulating system.

Cork is one material often used for making gaskets. While cork is compressible and relatively unaffected by oils, greases, gasoline, water, ethylene glycol, and such other liquids which it comes in contact in an internal combustion engine, cork is quite fragile and difficult to handle when setting a gasket in place as on an engine block. Further, when once compressed, cork tends to retain a permanent set and does not return to its original shape when a compressing pressure is released. As a result, cork gaskets are seldom reused and must be entirely replaced whenever disassembly of the engine block or other component is necessary.

Gasket facing materials in the automotive and truck industry are generally asbestos sheet materials bonded with a rubber binder. These materials are not waterproof and, as a result, have a high capacity for absorbing water, oil, coolants, and the like. This adsorption causes degradation of the facing, resulting in softening, loss of strength, and loss of adhesion between the facing and the core carrier of the gasket which is usually metal.

While some resinous materials have fluid resistance which adapt them to form a fluid barrier, they are not practical for gasket application, because they stick to metal under heat and pressure. Also, such resins are so smooth that it is most difficult to apply a uniform anti-stick coating over them. Often the parts joined about a gasket having a fluid barrier of this type cannot be disassembled without destroying the gasket. Also the gasket may stick so tightly to a part that it must be pried or chiseled away which inadvertently can damage the mating surface of such a part. This requires either a refinishing operation on the surface or an entire replacement of the part affected.

U.S. Pat. No. 2,025,486 to Victor discloses an impregnant for a gasket comprising aluminum sterate partially decomposed to a gummy consistency in solution with benzol and carbon tetrachloride with a suitable thinner.

U.S. Pat. No. 2,040,348 to Victor et al describes a saturant for an asbestos gasket comprising a composition resulting from a mixture of drying vegetable oils, such as China wood oil, linseed oil, turpentine, and metallic resinates.

U.S. Pat. No. 3,738,558 to Colwell discloses a thin gasket for high compression engines comprising two outer metal sheets and a compressible filler which may comprise fibers impregnated with a binder.

U.S. Pat. No. 3,970,322 to Stecher et al describes a cylinder head gasket for internal combustion engines comprising at least one layer of a soft material having pores which are enriched with an impregnating agent and edges which are bordered by a casing. The pores of the soft material underneath a flange are kept free of the impregnating agent.

The patents mentioned herein are hereby incorporated by reference.

SUMMARY OF THE INVENTION

The principal object of the present invention is to provide an improved laminated gasket that resists absorption of liquids in spite of constant exposure thereto; that can be removed from metallic assemblies without substantially damaging either the gasket or a metallic part of the assembly; and that has a long, useful life free of premature delamination.

The present invention relates to an anti-stick, non-liquid absorbing laminated gasket having improved resistance to delamination which, in one form, comprises a metallic core carrier, such as metallic base sheet, and a bonded fibrous layer adhered to at least one face and preferably to both faces of the sheet. The fibrous layer contains a liquid-impermeable, resinous impregnant which extends lengthwise through the fibrous layer. An anti-stick coat lies along an outer face of the fibrous layer.

The fibers of the layer may be asbestos and bonded together with an elastomeric resin. The resinous impregnant may comprise a number of resinous materials but desirably is an epoxy resin and preferably comprises an epoxy resin containing a triazine-aldehyde or amino-triazine-aldehyde resin. The anti-stick coat may be selected from the group consisting of silicones, polysiloxanes, graphite, talc, bentonite, polytetraflouroethylene, and the like.

The combination of the liquid-impermeable resinous impregnant and the anti-stick coat may occur in several ways. The liquid-impermeable impregnant may extend substantially to the outer face of the fibrous layer while leaving fibers thereof exposed. The anti-stick coat may then contact and adhere to the exposed fibers of the fibrous layer. Or the liquid-impermeable resinous impregnant may extend beyond the outer face of the layer and form a skin. In this case, the anti-stick coat covers and adheres to the surface of the resinous impregnant which extends beyond the outer face of the fibrous layer. In any case, the gasket may be perforated or otherwise contain an opening extending therethrough so as to define a passage such as a metering hole.

To prepare the non-stick, non-liquid absorbing gasket, a bonded fibrous layer is adhered to at least one face and preferably opposed faces of a metallic core carrier. The fibrous layer is then impregnated with a liquid-impermeable material, and an anti-stick coat next applied along an outer face of the fibrous layer.

DESCRIPTION OF THE PREFERRED EMBODIMENTS

Figure 1:
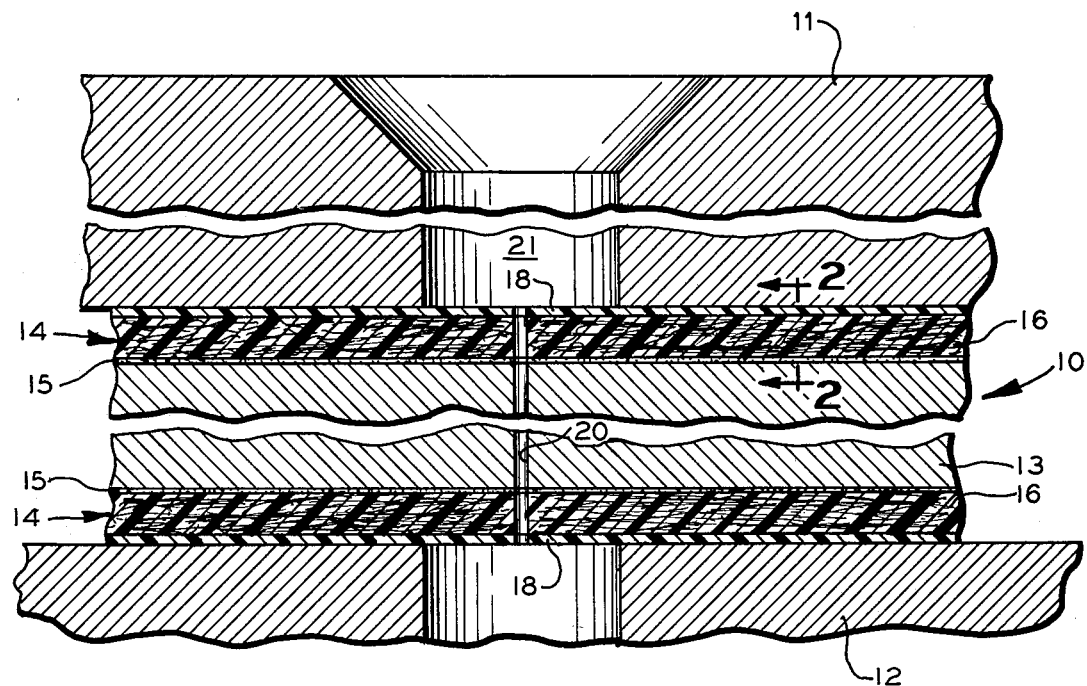
FIG. 1 is an enlarged, fragmentary cross-section of a present gasket placed between an engine head and engine block.

The present gasket has a laminated construction including a metal core carrier, such as a metallic base sheet. A bonded fibrous layer adheres to at least one and preferably two faces or sides of the metal core carrier and contains a liquid-impermeable, resinous impregnant which extends through the fibrous layer, so that the layer acts as a barrier to the flow of fluids toward the metal core. The resinous impregnant may extend coincidentally with the outer face of the fibrous layer while leaving fibers thereof exposed; or the impregnant may extend beyond the outer face of the layer to form an exposed skin of impregnation. An anti-stick coat lies along the outer face of the fibrous layer and adheres to either the exposed fibers or the exposed skin of impregnant, depending on the embodiment used.

The nature of the materials used are initially discussed, followed by a description of two specific embodiments illustrated by the figures. Finally, other specific examples of the present gasket are given.

The metal core carrier usually is in the form of a base sheet, such as a sheet of cold rolled steel. The sheet, for example, may vary in thickness between about 0.015 inch to about 0.050 inch, although these values are not critical. The fibers of the fibrous layer may be either woven or non-woven and bound together with a binder resistant to water, ethylene glycol, alcohol, lubricating oils, steam, and the like at temperature and pressure conditions that are encountered when a gasket is used as between a cylinder block and enging head of an internal combustion engine. Asbestos fibers are preferred for the fibrous layer, but other fibers may be used such as cotton, flax, glass, ceramic, or synthetic fibers such as nylon.

The binder for the fibers may be a synthetic elastomer or a cured thermosetting resin. The type of binder employed depends largely upon the kind of fibers used in the fibrous layer. Although either type of binder may be used with any kind of fiber, it is generally preferred to use an elastomeric binder with asbestos and a thermosetting resin with the other described fibers. Among the synthetic elastomer binders which may be used are the resins of butadiene-acrylonitrile, neoprene, butadiene-styrene, and the like. Among the thermosetting binders which my be used are the resins of phenol-formaldahyde, melamine-formaldahyde, epoxy resins, and the like.

To bind the fibers into an integral fibrous layer, a solution, latex emulsion, or dispersion of the binder in a suitable, fugitive liquid medium is mixed with the fibers to the extent that at least most of the intersections of the fibers receive a binder coat. Then the assembly is heated to drive off the liquid medium and cure the binder to impart mass integrity to the fibrous layer. The binder may comprise from about 10% to about 20% by weight of the fibrous layer. It is understood that conventional fillers curing agents, stabilizers, accelerators, and the like may also be present in the resinous binder systems.

The liquid-impermeable, resinous impregnant may comprise a number of resins including epoxy, phenol-formaldehyde, urea-formaldehyde, melamine-formaldehyde, phenol-furfural, cross-linked polyester, and cross-linked polyurethane resins. These resins and the manner of preparing them are known in the art.

Epoxy resins are preferred and especially those resins comprising diglycideyl ethers of bisphenol A. However, novolac epoxy resins and cycloaliphatic epoxy resins may also be used. A particularly useful resinous impregnant comprises a mixture or blend of an epoxy resin and a thermosetting triazine-aldehyde resin, including thermosetting aminotriazine-aldehyde resins and mixtures thereof, in which the aldehyde may be formaldehyde, acetaldehyde, benzaldehyde, and the like, and the aminotriazine may be melamine, benzoquanamine, acetoquanamine, and the like. Any addition of any of the indicated triazine-aldehyde resins is advantageous, but normally such a resin is present in an amount of about 0.5% to about 25% by weight of the epoxy resin.

The indicated thermosetting triazine-aldehyde resins are aminoplasts and are formed by the polycondensation of an aldehyde with a nitrogen compound and a higher aliphatic alcohol. While triazine is usually employed to react as indicated, melamine, a cyclic trimer of cyanamide, and the other aminotriazines may also be used. Formaldehyde is the preferred aldehyde.

Prior to impregnation of the fibrous layer, it is affixed to a metal core carrier, usually a metallic base sheet. Adhesives are recommended for this purpose which may be any of the materials previously disclosed as suitable for binding the fibers of the fibrous layer. The adhesives may be suitably applied to the metal core carrier or to a face of the fibrous layer or to both, as by roller coating. Thereafter, the sheet and layer are pressed together to effect adherence. Where needed or desirable, heat may be applied to the assembly to cure or polymerize the adhesive while pressing the metal core and carrier together. For elastomers especially, post-curing as in an oven may also be carried out.

A liquid solution or dispersion of the resinous impregnant is used to apply the resin to a fibrous layer. For example, the fibrous layer may be sprayed with or soaked in a solution or dispersion for a sufficient time to receive a desired load of the resinous impregnant. The amount of the resinous impregnant is not critical. It is necessary, however, that there be sufficient impregnant to form a continuous barrier which makes the layer liquid-impermeable in a direction from one major face of the layer to another. The liquid solvents or dispersants that are employed include organic liquids such as alcohols like ethanol, butanol, higher alcohols such as capryl and octyl, Cellosolve, Cellosolve acetate, ethyl acetate, butyl acetate, methyl ethyl ketone, acetone, benzene, toluene, xylene, and the like.

As an example, a fibrous layer may be immersed in a solution or dispersion containing from about 10% to about 40% by weight of solids of a resinous impregnant for about 15 seconds to about 45 minutes. In one instance, a fibrous layer about 0.015 inch in thickness acquired an impregnating barrier equal in thickness to that of the fibrous layer after a 20 minute soak in an organic solvent containing 30% by weight of solids of the resinous impregnant. Small amounts of plasticizers, flow agents, cure accelerators, and the like as are known in the art may also be used in the formulation comprising the resinous impregnant. Catalysts are known in the art for all of the resinous systems disclosed. In particular, an acid catalyst may be used for the triazine-aldehyde and aminotriazine-aldehyde resins, such as paratoluenesulfonic acid, methanesulfonic acid, mono-dibutyl acid orthophosphate, and trifluoroacetic acid.

After the resin-impregnant is applied to the fibrous layer, the assembly is heated. The initial heat drives off the liquid solvent or dispersant. Consequent heating cures or polymerizes the resin impregnant to an infusible state. Exemplary heating schedules are easily determined by trial and error but usually range from about 325° F. to about 400° F. for about two minutes to about 15 minutes.

As a final step, an anti-stick coat is applied along the outer of the fibrous layer. The anti-stick coat may comprise any slippery, relatively low coefficient of friction material, such as silicones, polysiloxanes like dimethylpolysiloxane and methylphenylpolysiloxane, graphite, talc, bentonite, polytetraflouroethylene, and the like. For example, silicone release compositions can be generally prepared by first forming a curable composition consisting of a hydroxy end-blocked dimethylsiloxane gum stock; a cross-linking agent such as a siloxane fluid containing silicone bonded hydrogen units (Si—H); a catalyst such as a metal salt of a carboxylic acid; and a solvent such as xylene. The composition is applied to a fibrous layer as a coat as by roller coating, curtain or knife coating, and the coated assembly then mildly heated to drive off the solvent. Thereafter, the siloxane composition is cured at relatively high temperatures, for example, about 212° F. to about 300° F. to cross-link the siloxane gum and form the desired anti-stick coat.

Figure 2:
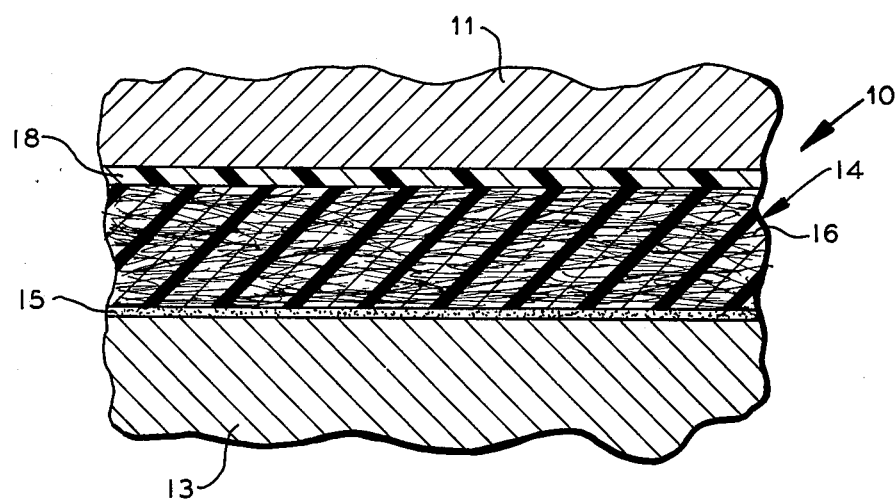
FIG. 2 is a section of FIG. 1 on the line 2—2.

The figures illustrate two embodiments of the present gasket. In FIGS. 1 and 2 the resinous impregnant extends to the outer face of a fibrous layer while leaving fibers thereof exposed; in FIGS. 3 and 4 the resinous impregnant extends beyond a major face of a fibrous layer to form a skin of impregnant.

More particularly, in the enlarged, fragmentary views of FIGS. 1 and 2, a present gasket generally represented at 10 lies between an engine head 11 and an engine block 12. Gasket 10 includes a metallic base sheet 13 to both sides of which a bonded asbestos layer 14 adheres by means of an adhesive 15 of butadiene-acrylonitrile elastomer. Each layer 14 has the same construction and, as best illustrated by FIG. 2, contains a resinous impregnant 16 which by way of example may comprise an epoxy resin containing in admixture a triazine-formaldehyde resin.

The resinous impregnant 16 is continuous lengthwise of each layer 14 so as to form an unbroken barrier to the flow of fluids through the gasket. Although in FIG. 2 the resinous impregnant 16 is shown as substantially filling the voids of a layer 14 in a widthwise direction, it need not do so. In any event, it is important that resinous impregnant 16 extends substantially to the outer face of a layer 14 while leaving fibers of the layer exposed along such outer face. The exposed fibers and outer face of each layer 14 define an anchoring zone for an anti-stick coat.

In FIG. 2, for example, an anti-stick coat 18 extends along an outer face of a layer 14 and makes sufficient adherent contact with the exposed fibers of the layer to anchor coat 18 onto layer 14.

The gasket may have an aperture 20 adapted to register with a blind hole 21 formed in the casting of engine head 11 or with still other openings provided in a cylinder block with which it is to be used. It is because of such apertures that gaskets are so subject to deterioration and delamination by constant exposure to fluids passing through or caught in the apertures. In the embodiment of FIGS. 1 and 2 as well as the embodiment of FIGS. 3 and 4, it will be appreciated that gasket 10 can be free of any opening like aperture 20. In this case engine block 12 is solid across that portion shown in FIG. 1, although engine head 11 may still have blind hole 21. Conversely, all of engine head 11, gasket 10, and engine block 12 may have aligned openings of the same size.

Figure 3:
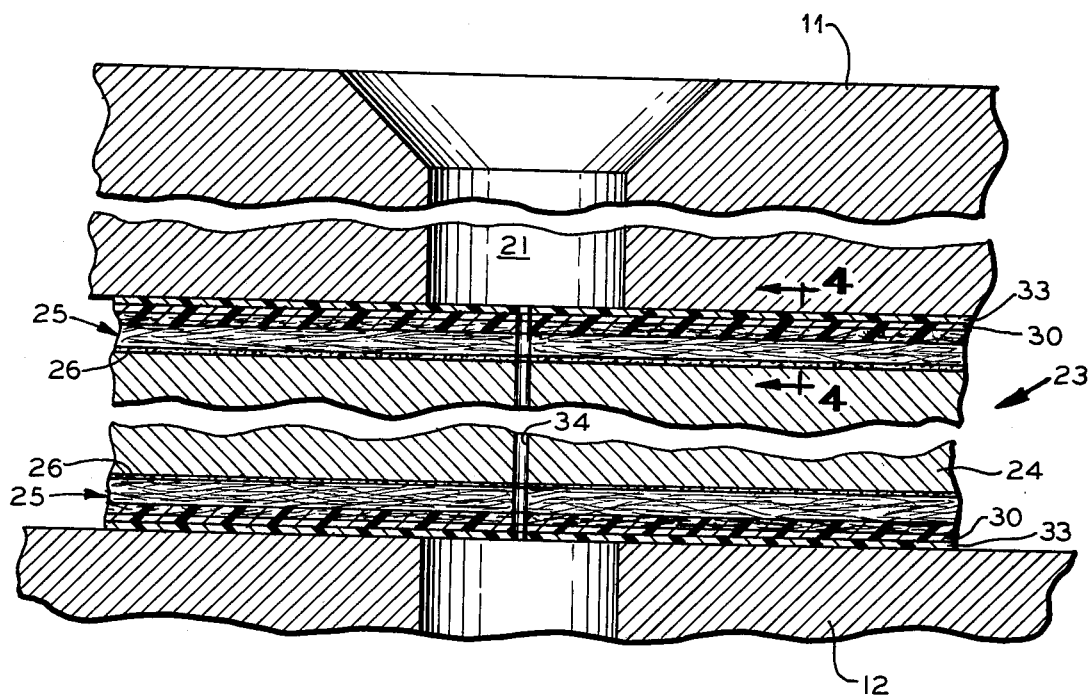
FIG. 3 is an enlarged, fragmentary cross-section similar to FIG. 1 and illustrates a modification of the gasket.
Figure 4:
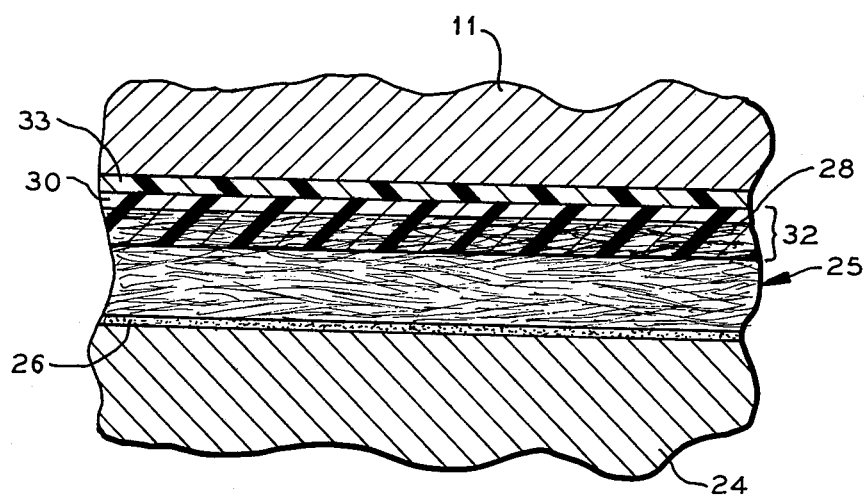
FIG. 4 is a section of FIG. 3 on the line 4—4.

In the enlarged fragmentary views of FIGS. 3 and 4, a modified form of gasket, generally represented at 23, lies between an engine head 11 and an engine block 12. Gasket 23 includes a metallic base sheet 24 to both sides of which an asbestos layer 25 adheres by means of an adhesive 26. Each layer 25 has the same construction and contains a resinous impregnant 28.

In this embodiment, impregnant 28 penetrates the outer face of a layer 25 and into the layer a desired distance. The amount of penetration is not critical as long as it is sufficient to form a barrier which prevents the flow of fluids through the gasket. In FIG. 4, the thickness of the barrier defined by impregnant 28 is shown by the bracketed number 32. It will be noted that the barrier extends beyond an outer face of fibrous layer 25 to form an exposed skin 30 which is enlarged in FIG. 4 for purposes of illustration. The skin also serves to improve the surface sealability of the gasket. An anti-stick coat 33 lies along and contacts skin 30.

The construction of FIGS. 3 and 4 would not normally be thought to be operable due to cohesion problems between resinous impregnant 28 and anti-stick coat 33. Because of the same properties which make the described materials of anti-stick coat poor wetting, slippery, and stick-free, it is most difficult normally to have the anti-stick coat stick to the resinous impregnant.

However, it has been discovered that the coherence problems normally met with the construction of FIGS. 3 and 4 with an anti-stick coat can be overcome by tackifying the surface of the resinous impregnant 28 with an organic solvent system containing the anti-stick material. There is apparently a solvating action which takes place on the resinous impregnant which sufficiently fuses or merges immediately adjacent portions of the resinous and anti-stick materials into a joint, welded assembly. The organic solvent chosen depends upon the materials selected for the impregnant and anti-stick coat. Satisfactory solvents include acetone, methyl ethyl ketone, ethyl butyl ketone, diacetone alcohol, benzene, toluene, xylene, benzaldehyde, carbon tetrachloride, perchloroethylene, and the like. The anti-stick coating can be applied by brushing, spraying, roller coating, and the like.

The embodiment of FIGS. 3 and 4 may also have an aperture or metering hole 34 communicating with blind hole 21 of engine head 11. It will be apparent that a laminated gasket may be formed with an aperture designed in practice either to restrict the flow of fluids through it or stop the flow entirely. In either case, the gasket is constantly exposed in use to fluids and their cummulative damaging effects.

The following examples only illustrate the invention and should not be construed as imposing limitations on the claims. Percentages are by weight unless otherwise indicated.

EXAMPLE 1

A resinous impregnating formulation was prepared comprising the following:

| Ingredient | Weight |
| --- | --- |
| Epoxy Resin | 100.000 grams |
| Triazine-formaldehyde resin | 25.000 grams |
| Castor Oil | 5.850 grams |
| Xylol | 3.290 grams |
| Dimethylpolysiloxane | 0.025 grams |
| Butanol | 0.260 grams |
| Parafin Wax | 1.660 grams |
| p-Toluene sulfonic acid | 0.375 grams |
| | 136.460 grams |

The epoxy resin was an oil modified epoxy sold by the Celanese Coatings Company under the trademark "EPI-TEX" 101. The triazine-formaldehyde resin was thermosetting and sold under the trademark "UNFORMITE" MX-61. The castor oil was a lightly polymerized oil of pale color and was used as a plasticizer. It had an acid value of 4 and a hydroxyl value of 160. The dimethylpolysiloxane had a kinematic viscosity of about 100 centistokes. The wax had a melting point within a range of about 133° F. to about 136° F. The p-Toluene sulfonic acid was the catalyst for the resinous system.

Two asbestos layers, each having a thickness of about 0.015 inch and bound by a butadiene-acrylonitrile elastomer, were adhesive bonded to opposite sides of a steel sheet having a thickness of about 0.015 inch. The resulting laminate was roll coated with the impregnating formulation, so that the solids content penetrated the outer face of each fibrous layer and left an exposed skin of impregnant spaced from the layer. The liquid content of the formula then was driven off by lightly heating the layers and the resinous impregnant then cured by heating for about 10 minutes to about 15 minutes at about 350° F. to about 375° F. If the impregnation is not as complete as desired, or if additional surface deposition of the resinous impregnant is sought, the process as described can be repeated.

The impregnated surfaces of the asbestos layers were then roll coated with an anti-stick silicone material of the type previously described. The anti-stick coat adhered to the exposed skin of the epoxy resin and completed fabrication of the gasket.

EXAMPLE 2

A process was carried out like the process of Example 1, except that 139.54 to 690 grams of xylol were added to the initial formulation to provide solutions containing 10% to 30% by weight solids. The metal sheet-fibrous layer laminates were immersed in the various solutions for about 15 seconds to about 45 minutes depending on the amount of solids present, and then removed and heated to drive off the liquid content and polymerize the epoxy and triazine-formaldehyde resins. This produced a continuous barrier of the resinous impregnant in each fibrous layer which extends substantially to the outer face of each layer while leaving fibers exposed. A silicone anti-stick material was roll coated onto such outer face of each layer and adhered to the exposed fibers.

Although the foregoing describes several embodiments of the present invention, it is understood that the invention may be practiced in still other forms within the scope of the following claims:

We claim:

1. An anti-stick, non liquid absorbing, laminated gasket having improved resistance to delamination, said gasket comprising a metallic base sheet and a bonded fibrous layer laminated to at least one face of said base sheet in side-by-side relation, said fibrous layer containing a liquid-impermeable resinous impregnant extending throughout the fibrous layer as a substantially continuous barrier to make said layer liquid-impermeable in a direction from one face thereof to the other, and an anti-stick coat disposed along an outer face of said fibrous layer and adhered to said layer substantially solely by contact with fibers of said layer or with said resinous impregnant barrier.

2. The gasket of claim 1 in which the fibers of said layer are asbestos.

3. The gasket of claim 1 in which the bond of said fibrous layer is elastomeric.

4. The gasket of claim 1 in which said resinous impregnant is a resin selected from the group consisting of epoxy, phenolformaldehyde, urea-formaldehyde, melamine-formaldehyde, phenol-furfural, cross-linked polyester, and cross-linked polyurethane resins.

5. The gasket of claim 1 in which said resinous impregnant is an epoxy resin.

6. The gasket of claim 1 in which said resinous impregnant is an epoxy resin containing a triazine-aldehyde or aminotriazine-aldehyde resin.

7. The gasket of claim 1 in which said anti-stick coat comprises an anti-stick material selected from the group consisting of polytetraflouroethylene, silicones, polysiloxanes, graphite, talc, and bentonite.

8. The gasket of claim 1 in which said liquid-impermeable resin barrier extends substantially to said outer face of the fibrous layer while leaving fibers thereof exposed, and said anti-stick coat contacts and adheres to said exposed fibers of the outer face.

9. The gasket of claim 1 in which said liquid-impermeable resinous barrier extends beyond said outer face of the fibrous layer, and said anti-stick coat contacts and adheres to said extension of the impregnant without contacting fibers of said fibrous layer.

10. An anti-stick, non-liquid absorbing, laminated gasket having improved resistance to delamination, said gasket comprising a metallic base sheet and a bonded fibrous layer adhered to both faces of said sheet, each fibrous layer containing a liquid-impermeable resinous impregnant extending throughout the fibrous layer without reaching an outer face of the fibrous layer to leave a non-impregnated, outer section of said layer, and an anti-stick coat covering said outer face of each fibrous layer and penetrating into said non-impregnated section to adher the fibers of said fibrous layer, said metallic sheet, bonded fibrous layers and anti-stick coat together.

11. An anti-stick, non-liquid absorbing, laminated gasket having improved resistance to delamination, said gasket comprising a metallic base sheet and a bonded fibrous layer adhered to both faces of said sheet, each fibrous layer containing a liquid-impermeable resinous impregnant extending throughout the fibrous layer and beyond an outer face of the fibrous layer, and an anti-stick coat covering and adhered to an organic solvent tackified surface of said resinous impregnant extending beyond said outer face of each fibrous layer, said metallic sheet, bonded fibrous layers, and anti-stick coat thereby being bound together.

12. The gasket of claim 10 or 11 in which the fibers of said fibrous layers are asbestos.

13. The gasket of claim 10 or 11 in which said bonded fibrous layers comprise asbestos fibers bonded together by an elastomeric resin.

14. The gasket of claim 10 or 11 in which said resinous impregnant is an epoxy resin containing a triazine-aldehyde or aminotriazine-aldehyde resin.

* * * * *